(12) United States Patent
Kao

(10) Patent No.: US 9,456,585 B1
(45) Date of Patent: Oct. 4, 2016

(54) PET FECES RECEIVING AND CARRYING DEVICE

(71) Applicant: Yi-Fong Kao, New Taipei (TW)

(72) Inventor: Yi-Fong Kao, New Taipei (TW)

( * ) Notice: Subject to any disclaimer, the term of this patent is extended or adjusted under 35 U.S.C. 154(b) by 0 days.

(21) Appl. No.: 14/922,193

(22) Filed: Oct. 25, 2015

(30) Foreign Application Priority Data

May 27, 2015 (TW) .............................. 104208255 U

(51) Int. Cl.
*A01K 29/00* (2006.01)
*A01K 23/00* (2006.01)

(52) U.S. Cl.
CPC .................. *A01K 23/005* (2013.01)

(58) Field of Classification Search
CPC .............. A01K 23/005; E01H 1/1206; E01H 2001/1266; E01H 2001/1273; E01H 2001/128; E01H 2001/1286; E01H 2001/1226; E01H 2001/1293; E01H 2001/1233
USPC ........................................... 294/1.5, 1.3, 1.4
See application file for complete search history.

(56) References Cited

U.S. PATENT DOCUMENTS

| | | | | |
|---|---|---|---|---|
| 4,852,924 A * | 8/1989 | Ines | ..................... | A01K 23/005 294/1.5 |
| 6,942,264 B1 * | 9/2005 | Mendez | ............... | A01K 23/005 294/1.5 |
| 8,038,190 B2 * | 10/2011 | Zidulka | ................ | A01K 23/005 294/1.4 |
| 2002/0140240 A1 * | 10/2002 | Charette | .............. | A01K 23/005 294/1.5 |
| 2006/0145492 A1 * | 7/2006 | Kaas | ..................... | A01K 23/005 294/1.5 |
| 2009/0096227 A1 * | 4/2009 | Pender | ................. | A01K 23/005 294/1.5 |
| 2016/0050885 A1 * | 2/2016 | Brasuel | ................ | A01K 23/005 294/1.5 |

FOREIGN PATENT DOCUMENTS

TW  M491332 U  * 12/2014

* cited by examiner

*Primary Examiner* — Gabriela Puig
(74) *Attorney, Agent, or Firm* — Leong C. Lei

(57) ABSTRACT

A pet feces receiving and carrying device includes a rod, a pivotal joint seat mounted to an end of the rod, a rotary seat is pivotally coupled to the pivotal joint seat, a ring member attached to the rotary seat, and an arrestor module for selectively releasing and fixing the pivotal joint seat and the rotary seat at multiple relative angular positions so that the ring can be set on the pivotal joint seat at any desired angular position by means of the arrestor module.

18 Claims, 6 Drawing Sheets

PET FECES RECEIVING AND CARRYING DEVICE

(a) TECHNICAL FIELD OF THE INVENTION

The present invention relates generally to a hand-operating device for manually collecting feces of pets, such as those of cats and dogs, with bare hands, and more particularly to a pet feces receiving and carrying device featuring extendibility/retractability, foldability, and adjustable angular position for receiving pet feces.

(b) DESCRIPTION OF THE PRIOR ART

Various hand-operating tools or devices are available in the market for cleaning the droppings of pets. An example is illustrated in Taiwan Utility Model M491332, which discloses a feces pick-up device and generally comprises a rod having an end to which a coupling assembly is mounted. The coupling assembly comprises a ring attached thereto. To use, a bag is fit over the ring and the coupling assembly is operated to adjust an expansion angle of the ring with respect to the rod. When a pet excretes, the pet owner may hold the rod with hands to have the ring reach out to be located under the body of the pet so that the droppings may fall into the bag that is arranged at a central portion of the ring. Thus, before falling onto the ground, the droppings have been collected so that the droppings do not cause any environmental hygiene issue and the pet owner may handle the droppings in an easy and hygiene manner.

However, although the coupling assembly of the device disclosed in Taiwan Utility Model M491332 is operable for adjusting and selectively fixing the ring at any desired angular position, the fixing of the angular position of the coupling assembly is achieved with a frictional force induced between interfering components of the coupling assembly. Thus, when the feces collected and received in the bag at the center of the ring is heavier than the frictional force induced between the components of the coupling assembly, the coupling assembly may get loosened and losing the effect of fixing the angular position of the ring. In other words, the coupling assembly is incapable of securely fixing the ring at a desired position and this easily leads to loosening, swinging, deviation, or deflection when the ring receives and carries the weight and gets unexpected impact with the ground. It is not possible for such a device to repeatedly use for collecting pet droppings multiple times, making the use very inconvenient. In view of these problems, the present invention aims to provide a pet feces receiving and carrying device that overcomes the above-discussed drawbacks and shortcomings of the prior art.

SUMMARY OF THE INVENTION

Thus, the primary object of the present invention is to overcome the problem of the prior art device that an angular position of a ring is selectively fixed at a desired angle by employing a frictional force between interfering components so that the ring, after receiving and carrying the weight of pet feces or unexpectedly impacting the ground, may get loosened, swung, deviated, or deflected and that the prior art device is incapable of receiving and collecting pet feces for multiple time.

To achieve the above object, a structure according to the present invention comprises a rod, a pivotal joint seat mounted to an end of the rod, a rotary seat is pivotally coupled to the pivotal joint seat, and a ring member attached to the rotary seat, wherein the pivotal joint seat and the rotary seat are rotatable relative to each other and an arrestor module is arranged between the pivotal joint seat and the rotary seat in such a way that the arrestor module is operable for adjusting the relative position of the rotary seat with respect to the pivotal joint seat to selectively fix the rotary seat so as to allow the ring member to be selectively switched between a collapsed condition and an expanded condition with respect to the rod. The arrestor module controls the pivotal joint seat and the rotary seat to be selectively set and fixed at one of multiple angular positions therebetween.

As such, when the pet feces receiving and carrying device is not in use, the ring member can be rotated in a direction toward the rod to have the ring member folded on the end of the rod thereby shortening the overall length of the rod 1 to achieve an effect of saving space. To use, the arrestor module is operable to allow for rotation and adjustment of the ring member to a desired angular position. As such, the expansion angle of the ring member can be adjusted as desired according to the condition of feces of a pet and the arrestor module may selectively set the ring member at a fixed position on the pivotal joint seat to improve the secureness of the ring member set at any desired angular position, whereby during the process of collecting and receiving the pet feces through the ring member, the ring member does not get loosened, swung, deviated, or deflected by the weigh of the feces or due to unexpected impact with the ground. As such, the rod and the arrestor module may be used to adjust the angular position of the ring member so as to allow a pet owner to conveniently collect and receive pet feces, protecting the owner's hands from directly touching the pet feces thereby achieving advantages of improving hygiene of operation and easy use. Further, the pet feces are prevented from falling on the ground, which may need to be picked up manually.

With the above-described technique, the problem of the prior art feces pick-up device that it is not possible to fix the ring at any desired angular position and it is not possible to receive feces of pets for multiple times can be overcome and advantage as discussed above may be achieved.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

Figure 1:
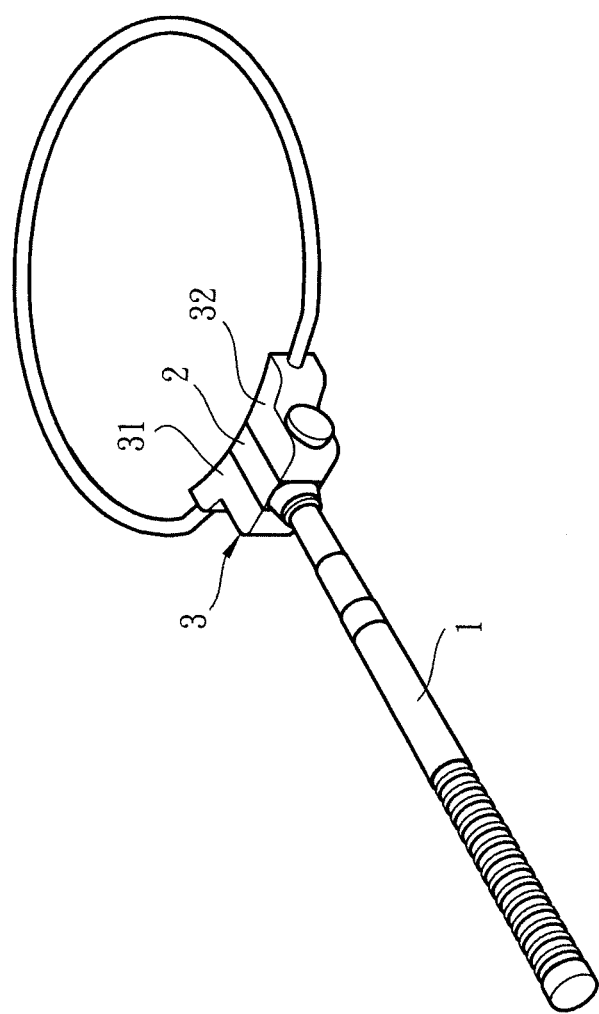
FIG. 1 is a perspective view of the present invention.

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Referring to FIGS. 1-8, the drawings clearly show the present invention comprises:

a rod 1;

a pivotal joint seat 2, which is mounted to an end of the rod 1;

a rotary seat 3, which is pivotally coupled to the pivotal joint seat 2 to allow the pivotal joint seat 2 and the rotary seat 3 to relatively rotate with respect to each other;

a ring member 4, which is attached to the rotary seat 3; and an arrestor module 5, which is arranged between the pivotal joint seat 2 and the rotary seat 3 for fixing the rotary seat 3 in an adjustable manner so that the ring member 4 is selectively switched between a collapsed condition and an expanded condition with respect to the rod 1.

In a preferred example, the arrestor module 5 controls the pivotal joint seat 2 and the rotary seat 3 to conduct an operation of being selectively set at each of a number of different relative angular positions therebetween. As such, the arrestor module 5 may selectively fix (and release) the pivotal joint seat 2 and the rotary seat 3 at one of multiple relative angular positions therebetween to allow the ring member 4 to be selectively set at various angular positions with respect to the pivotal joint seat 2 by means of the arrestor module 5.

The rotary seat 3 comprises a first accommodation hole 33, a second accommodation hole 34 opposite to the first accommodation hole 33, and a pivotal joint space 30 formed between the first accommodation hole 33 and the second accommodation hole 34. The pivotal joint seat 2 is arranged and received in the pivotal joint space 30. Specifically, the rotary seat 3 comprises a first rotary member 31 and a second rotary member 32. The first rotary member 31 and the second rotary member 32 are respectively set at two opposite sides of the pivotal joint seat 2. The pivotal joint space 30 is located between the first rotary member 31 and the second rotary member 32. The first accommodation hole 33 is formed in a portion of the first rotary member 31 that is in contact with the pivotal joint seat 2. The second accommodation hole 34 is formed in a portion of the second rotary member 32 that is in contact with the pivotal joint seat 2. The ring member 4 has two ends that are respectively attached to the first rotary member 31 and the second rotary member 32. Further, the pivotal joint seat 2 comprises, formed therein, an axle hole 21 extending through opposite sides thereof and communicating with the first accommodation hole 33 and the second accommodation hole 34. The arrestor module 5 is received and arranged in and between the first accommodation hole 33, the axle hole 21, and the second accommodation hole 34 in such a way that the rotary seat 3 and the pivotal joint seat 2 are pivotally connected by means of the arrestor module 5.

Figure 2:
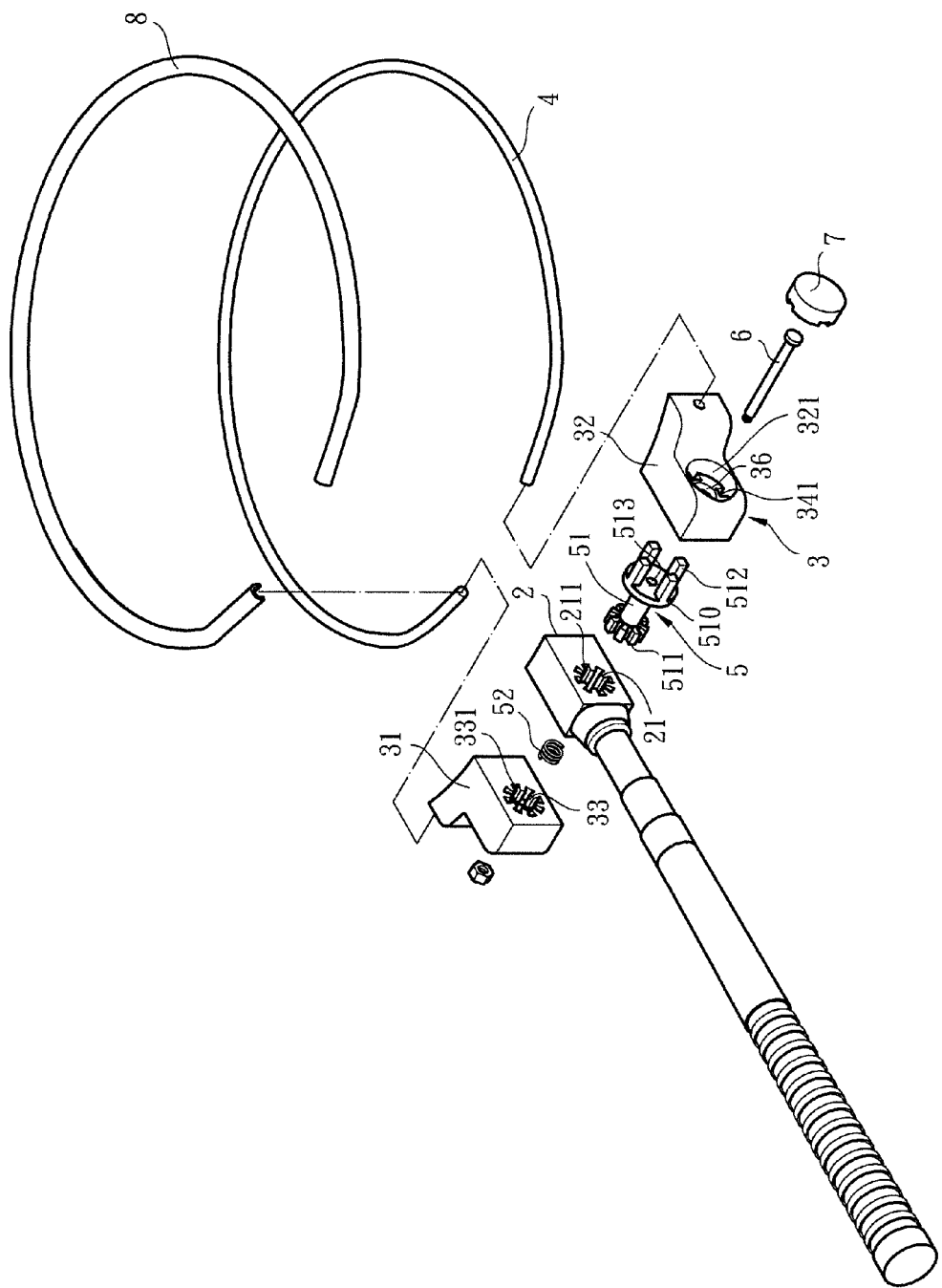
FIG. 2 is an exploded view of FIG. 1.
Figure 3:
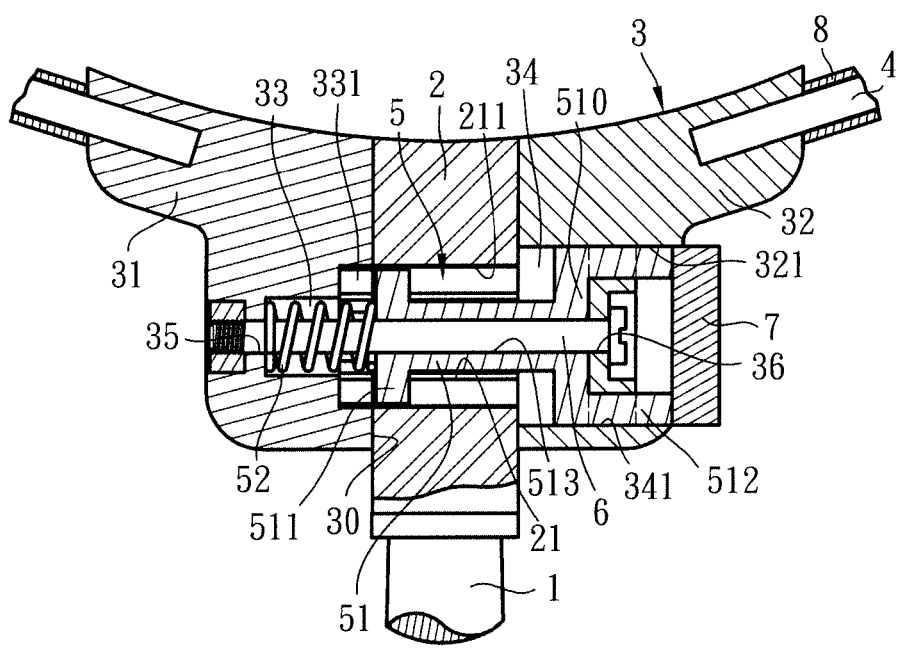
FIG. 3 is a cross-sectional view, in a magnified form, of a portion of FIG. 1.

As shown in FIGS. 2 and 3, the rotary seat 3 has two side portions respectively provided with a first through hole 35 that is in communication with the first accommodation hole 33 and a second through hole 36 that is in communication with the second accommodation hole 34. An axle 6 is received in the first through hole 35, the first accommodation hole 33, the axle hole 21, the second accommodation hole 34, and the second through hole 36. The first accommodation hole 33 has an inner circumferential wall in which at least one first recess 331 is formed in a circumferentially distributed manner. The second accommodation hole 34 has an inner circumferential wall in which at least one second recesses 341 is formed in a circumferentially distributed manner. The axle hole 21 has an inner circumferential wall in which at least one third recesses 211 is formed in a circumferentially distributed manner. The arrestor module 5 comprises a cylindrical transmission member 51, at least one first protrusion 511, at least one second protrusion 512, and an elastic element 52. The first protrusion 511 is formed on an outer circumference of an end of the transmission member 51 and the first protrusion 511 is receivable into and engageable with the first recess 331 of the first accommodation hole 33. The transmission member 51 has an opposite end to which a rotation disk 510 is mounted. The second protrusion 512 is formed on a circumference of the rotation disk 510 to be located on an outer circumference of an opposite end of the transmission member 51. The second protrusion 512 is receivable in and engageable with the second recess 341 of the second accommodation hole 34. In the instant embodiment, the first recess 331, the second recess 341, the third recess 211, the first protrusion 511, and the second recesses 341 are each shown to be of plural ones.

The transmission member 51 comprises a through bore 513 formed therein and extending through two opposite ends thereof to receive the extension of the axle 6 therethrough. The transmission member 51 is guided, with the through bore 513 thereof, by the axle 6 to selectively move, in an axial direction of the axle 6, toward the first accommodation hole 33 or the second accommodation hole 34. The elastic element 52 can be a spring that is taken as an example in the instant embodiment. The elastic element 52 is fit over and encompasses the axle 6 and is set in tight engagement with and between an inner wall of the first accommodation hole 33 and the transmission member 51 so that the elastic element 52 may drive, via a biasing force thereof, an end of the transmission member 51 in such a way to have the first protrusion 511 moved into and engaging the third recess 211, making the transmission member 51 coupled to the pivotal joint seat 2 and the rotary seat 3 to provide an effect of fixing the pivotal joint seat 2 and the rotary seat 3 to each other.

Figure 4:
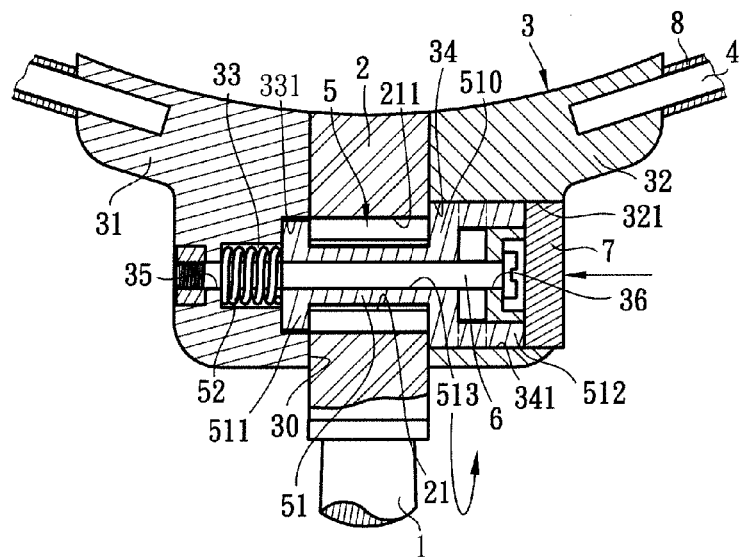
FIG. 4 is a cross-sectional view illustrating a condition of use of FIG. 3.
Figure 5:
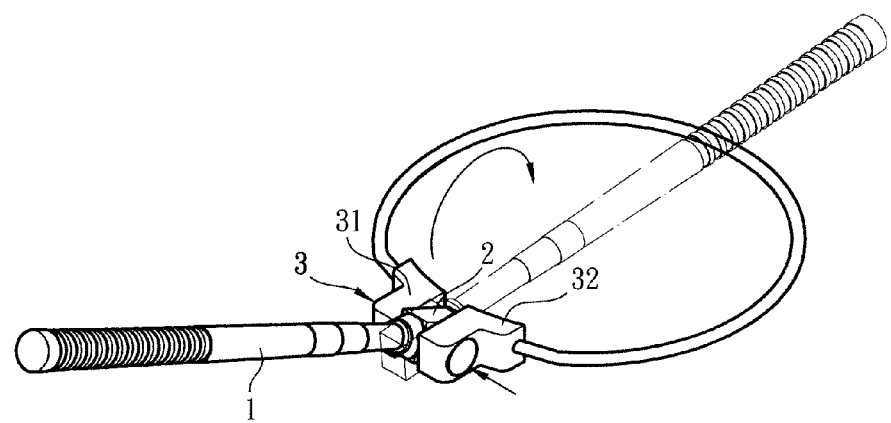
FIG. 5 is a schematic view illustrating a condition of use of FIG. 1.

As shown in FIGS. 2 and 4, the second recess 341 extends to and communicates with an outside wall of the rotary seat 3. The second protrusion 512 extends through the second recess 341 to the outside wall of the rotary seat 3 in such a way that a portion of the second protrusion 512 that extends outside the rotary seat 3 is coupled to a push button 7. When the push button 7 is pressed down or pushed inward, the first protrusion 511 of the transmission member 51 is driven away from and thus disengages from the third recess 211 and moved into and engaging with the first recess 331, making the transmission member 51 release the effect of fixing the pivotal joint seat 2 and the rotary seat 3. Referring further to FIG. 5, when the first protrusion 511 is moved into the first recess 331, the second protrusion 512 is located in the second recess 341, and under such a condition, the third recess 211 of the axle hole 21 is not in engagement with the first protrusion 511 so that the transmission member 51 is located in the axle hole 21 in a rotatable condition and thus, the pivotal joint seat 2 and the rotary seat 3 are allowed to rotate relative to each other, allowing the ring member 4 to rotate freely at the end of the rod 1 for adjusting and collapsing the ring member 4 on the end of the rod 1 or for adjusting a relative angle between the ring member 4 and the rod 1. Further, the outside wall of the second rotary member 32 of the rotary seat 3 comprises a cavity 321 formed therein and communicating with the second recess 341. The cavity 321 is made to receive the push button 7 therein.

Figure 6:
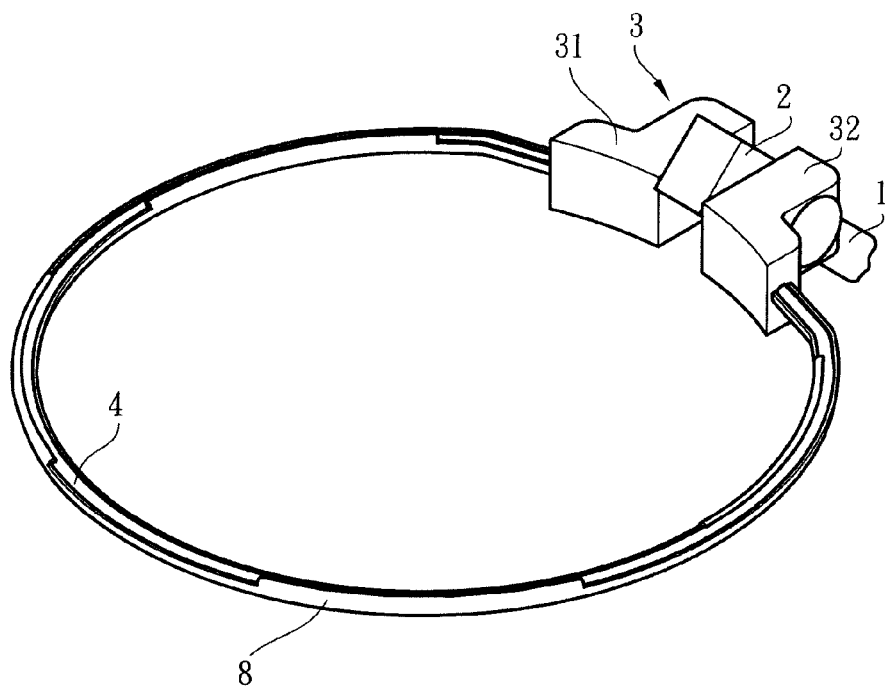
FIG. 6 is a perspective view, in a magnified form, of a portion of FIG. 1 taken from a different direction.
Figure 7:
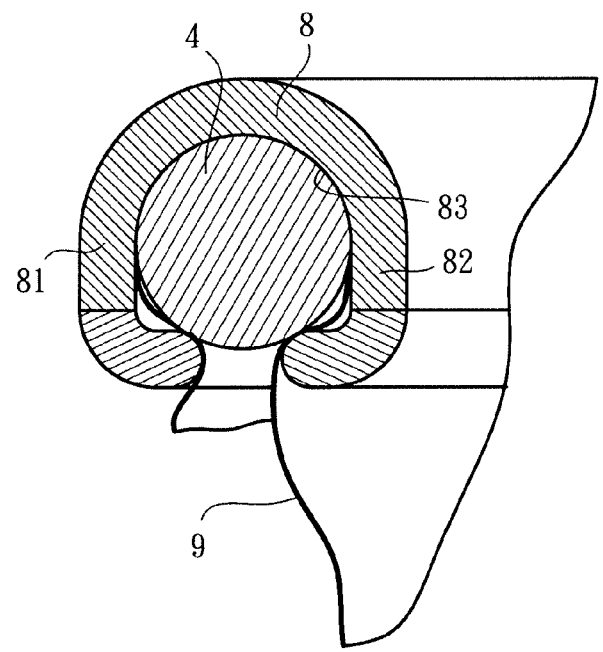
FIG. 7 is a cross-sectional view showing a ring and a holding strip of FIG. 6.

As shown in FIGS. 6 and 7, the ring member 4 is provided with a holding strip 8 that is fit over and mounted thereto to clamp and hold a bag 9. The holding strip 8 has a cross-section that shows a concavely recessed configuration that comprises two spaced and opposite clamping sections 81, 82 and a receiving groove 83 formed and delimited between the clamping sections 81, 82. When the holding strip 8 is fit over and mounted to the ring member 4, the clamping sections 81, 82 engage and clamp therebetween an outside surface of the ring member 4 so as to have the ring member 4 securely set and fixed in the receiving groove 83.

When not in use, the push button 7 that is arranged on the rotary seat 3 may be pressed down or pushed inwards (as shown in FIG. 4) so that the push button 7 pushes inwards the second protrusion 512 of the transmission member 51 to move the first protrusion 511 of the transmission member 51 from the third recess 211 of the axle hole 21 of the pivotal joint seat 2 into the first recess 331 of the first accommodation hole 33 of the rotary seat 3 to release the fixing effect between the pivotal joint seat 2 and the rotary seat 3. Under this condition, the ring member 4 may be rotated in a direction toward the rod 1 to have the ring member 4 folded on the end of the rod 1 thereby shortening the overall length of the rod 1 to achieve an effect of saving space. When the ring member 4 is folded toward the rod 1 to a desired position, the push button 7 may be released (as shown in FIG. 3) to allow the elastic element 52, via the spring force thereof, to drive and return the transmission member 51 to the initial position for moving the first protrusion 511 of the transmission member 51 from the first recess 331 of the first accommodation hole 33 of the rotary seat 3 into the third recess 211 of the axle hole 21 of the pivotal joint seat 2 to have the transmission member 51 coupled to both the pivotal joint seat 2 and the rotary seat 3, thereby providing an effect of fixing therebetween.

Figure 8:
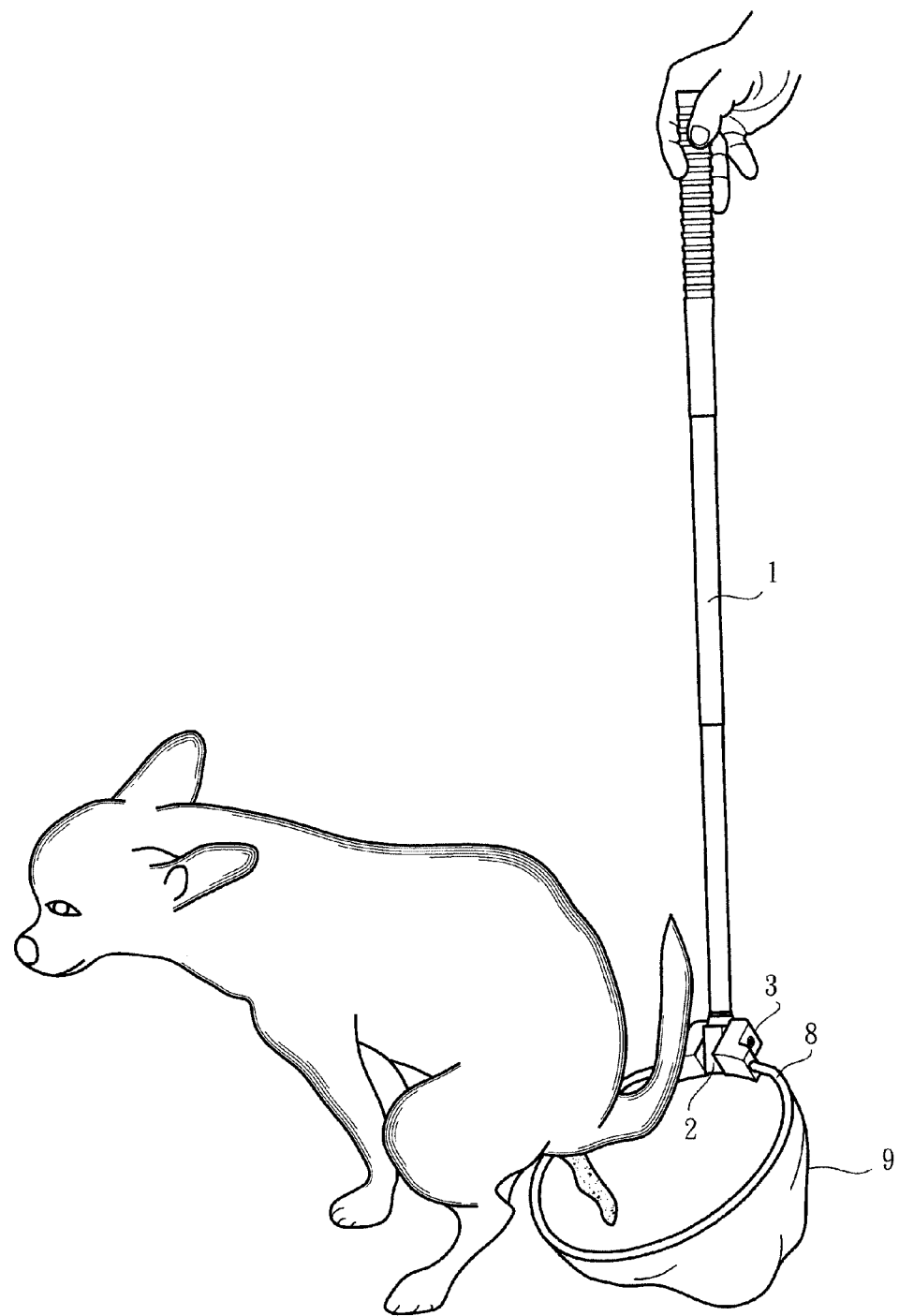
FIG. 8 is a schematic view illustrating the use of FIG. 1.

To use, a bag 9 is fit, in advance, over the ring member 4 (as shown in FIGS. 7 and 8) and the holding strip 8 is fit over the ring member 4 to securely clamp a circumferential edge of the bag 9 between the clamping sections 81, 82 and the receiving groove 83. A distal end of the rod 1 serves as a grip that can be held by a user, who is allowed to push or release the push button 7 to control the rotation and adjustment of the angular position of the ring member 4 by means of the arrestor module 5. As such, the expansion angle of the ring member 4 can be adjusted to accord with the dropping of pet's feces. Further, the arrestor module 5 may securely fix the ring member 4 to the pivotal joint seat 2 to allow the ring member 4 to be moved, in a proper time, to a location under the body of the pet so that an opening of the bag 9 may receive the feces of the pet at a suitable angle and location.

During this period, since the rotary seat 3 and the pivotal joint seat 2 are securely fixed together by the transmission member 51, even the feces of the pet is heavy, the ring member 4 would not get loosened, swung, deviated, or deflected. Further, even the user accidently and pushes the ring member 4 against the ground or an external object with a large force, the ring member 4 would not likely to cause the above discussed situations due to being compressed. After the feces of the pet is received in the bag 9, the weight of the feces received in the bag does not cause the ring member 4 to get loosened, swung, deviated, or deflected, so that in case a second time of dropping is needed for the pet, the securely held ring member 4 allows the bag 9 to be easily and correctly positioned for repeated use to receive and hold the feces. After the use, the holding strip 8 can be removed easily and quickly from the ring member 4 for releasing and removing the bag 9 from the ring member 4. The bag 9 can be closed to have pet feces enclosed therein to be disposed of with the bag 9 so as to prevent the feces from falling out to contaminate the surroundings and staining hands of the user through the process of removal and disposal of the bag 9. There is completely no concern that hands will be unexpectedly stained and need to be washed.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. A pet feces receiving and carrying device, comprising:
   a rod;
   a pivotal joint seat, which is mounted to an end of the rod;
   a rotary seat, which is pivotally coupled to the pivotal joint seat to allow the pivotal joint seat and the rotary seat to relatively rotate with respect to each other;
   a ring member, which is attached to the rotary seat; and
   an arrestor module, which is arranged between the pivotal joint seat and the rotary seat for fixing the rotary seat in an adjustable manner so that the ring member is selectively switched between a collapsed condition and an expanded condition with respect to the rod;
   wherein the rotary seat comprises a first accommodation hole, a second accommodation hole opposite to the first accommodation hole, and a pivotal joint space formed between the first accommodation hole and the second accommodation hole, the pivotal joint seat being arranged and received in the pivotal joint space, the pivotal joint seat comprising an axle hole formed therein and communicating with the first accommodation hole and the second accommodation hole, the arrestor module being received in and between the first accommodation hole, the axle hole, and the second accommodation hole.

2. The pet feces receiving and carrying device according to claim 1, wherein the arrestor module controls the pivotal joint seat and the rotary seat to conduct an operation of being selectively set and fixed at one of multiple angular positions therebetween.

3. The pet feces receiving and carrying device according to claim 1, wherein the first accommodation hole has an inner circumferential wall in which at least one first recess is formed in a circumferentially distributed manner; the second accommodation hole has an inner circumferential wall in which at least one second recess is formed in a circumferentially distributed manner; and the axle hole has an inner circumferential wall in which at least one third recess is formed in a circumferentially distributed manner; the arrestor module comprises a transmission member, at least one first protrusion that is formed on an outer circumference of an end of the transmission member and receivable into and engageable with the first recess, at least one second protrusion that is formed on an outer circumference of an opposite end of the transmission member and receivable into and engageable with the second recess, and an elastic element that drives the first protrusion to move into and engaging with the third recess so as to have the pivotal joint seat and the rotary seat coupled to each other.

4. The pet feces receiving and carrying device according to claim 3, wherein the second recess extends to and communicates with an outside wall of the rotary seat, the second protrusion extending through the second recess to the outside wall of the rotary seat in such a way that a portion of the second protrusion extends outside the rotary seat and is coupled to a push button that is operable to drive the first protrusion to move into the first recess so as to release the pivotal joint seat and the rotary seat from each other.

5. The pet feces receiving and carrying device according to claim 4, wherein the outside wall of the rotary seat comprises a cavity formed therein and communicating with the second recesses for receiving the push button therein.

6. The pet feces receiving and carrying device according to claim 4, wherein the rotary seat comprises a first rotary member and a second rotary member, the first rotary member and the second rotary member being respectively arranged at two opposite sides of the pivotal joint seat, the pivotal joint space being located between the first rotary member and the second rotary member, the first accommodation hole being formed in a side of the first rotary member that is in contact with the pivotal joint seat, the second accommodation hole being formed in a side of the second rotary member that is in contact with the pivotal joint seat, the ring member being attached to the first rotary member and the second rotary member.

7. The pet feces receiving and carrying device according to claim 4, wherein the ring member comprises a holding strip that is mounted thereto for clamping and fixing a bag.

8. The pet feces receiving and carrying device according to claim 3, wherein the elastic element is arranged between the first accommodation hole and the transmission member.

9. The pet feces receiving and carrying device according to claim 8, wherein the rotary seat comprises a first rotary member and a second rotary member, the first rotary member and the second rotary member being respectively arranged at two opposite sides of the pivotal joint seat, the pivotal joint space being located between the first rotary member and the second rotary member, the first accommodation hole being formed in a side of the first rotary member that is in contact with the pivotal joint seat, the second accommodation hole being formed in a side of the second rotary member that is in contact with the pivotal joint seat, the ring member being attached to the first rotary member and the second rotary member.

10. The pet feces receiving and carrying device according to claim 8, wherein the ring member comprises a holding strip that is mounted thereto for clamping and fixing a bag.

11. The pet feces receiving and carrying device according to claim 3, wherein the rotary seat comprises two side portions respectively provided with a first through hole that is in communication with the first accommodation hole and a second through hole that is in communication with the second accommodation hole, an axle being received in the first through hole, the first accommodation hole, the axle hole, the second accommodation hole, and the second through hole, the transmission member comprising a through hole formed therein to receive extension of the axle therethrough.

12. The pet feces receiving and carrying device according to claim 11, wherein the rotary seat comprises a first rotary member and a second rotary member, the first rotary member and the second rotary member being respectively arranged at two opposite sides of the pivotal joint seat, the pivotal joint space being located between the first rotary member and the second rotary member, the first accommodation hole being formed in a side of the first rotary member that is in contact with the pivotal joint seat, the second accommodation hole being formed in a side of the second rotary member that is in contact with the pivotal joint seat, the ring member being attached to the first rotary member and the second rotary member.

13. The pet feces receiving and carrying device according to claim 11, wherein the ring member comprises a holding strip that is mounted thereto for clamping and fixing a bag.

14. The pet feces receiving and carrying device according to claim 3, wherein said opposite end of the transmission member comprises a rotation disk mounted thereto and the second protrusion is mounted, in a circumferentially distributed manner, to a circumference of the rotation disk.

15. The pet feces receiving and carrying device according to claim 3, wherein the rotary seat comprises a first rotary member and a second rotary member, the first rotary member and the second rotary member being respectively arranged at two opposite sides of the pivotal joint seat, the pivotal joint space being located between the first rotary member and the second rotary member, the first accommodation hole being formed in a side of the first rotary member that is in contact with the pivotal joint seat, the second accommodation hole being formed in a side of the second rotary member that is in contact with the pivotal joint seat, the ring member being attached to the first rotary member and the second rotary member.

16. The pet feces receiving and carrying device according to claim 3, wherein the ring member comprises a holding strip that is mounted thereto for clamping and fixing a bag.

17. The pet feces receiving and carrying device according to claim 1, wherein the rotary seat comprises a first rotary member and a second rotary member, the first rotary member and the second rotary member being respectively arranged at two opposite sides of the pivotal joint seat, the pivotal joint space being located between the first rotary member and the second rotary member, the first accommodation hole being formed in a side of the first rotary member that is in contact with the pivotal joint seat, the second accommodation hole being formed in a side of the second rotary member that is in contact with the pivotal joint seat, the ring member being attached to the first rotary member and the second rotary member.

18. The pet feces receiving and carrying device according to claim 1, wherein the ring member comprises a holding strip that is mounted thereto for clamping and fixing a bag.

* * * * *